United States Patent [19]
Miller

[11] 3,915,315
[45] Oct. 28, 1975

[54] SHEET PILING APPARATUS
[75] Inventor: Paul William Miller, Warren, Ohio
[73] Assignee: Wean United, Inc., Pittsburgh, Pa.
[22] Filed: Apr. 17, 1974
[21] Appl. No.: 461,771

[52] U.S. Cl. .............. 214/6 FA; 198/134; 198/154; 271/DIG. 10
[51] Int. Cl.² ................ B65G 17/12; B65H 29/38
[58] Field of Search ...... 214/6 FA, 7; 198/134, 154; 271/83, 187, DIG. 10

[56] References Cited
UNITED STATES PATENTS

| | | | |
|---|---|---|---|
| 604,828 | 5/1898 | Hodges | 198/154 |
| 801,562 | 10/1905 | Waterhouse | 214/7 X |
| 1,306,509 | 6/1919 | Ziegler | 198/154 |
| 1,784,229 | 12/1930 | Fox | 198/134 |
| 1,853,478 | 4/1932 | Vincent | 198/134 |
| 2,324,930 | 7/1943 | Joa | 214/6 FA X |
| 2,392,032 | 1/1946 | Domville, Jr. et al. | 198/134 X |
| 3,019,886 | 2/1962 | Winkler et al. | 198/134 |
| 3,067,856 | 12/1962 | Gamble | 198/134 X |
| 3,548,895 | 12/1970 | Gentry | 214/6 H X |
| 3,605,992 | 9/1971 | Weber | 198/134 |

FOREIGN PATENTS OR APPLICATIONS

| | | | |
|---|---|---|---|
| 1,236,278 | 6/1960 | France | 214/6 FA |

Primary Examiner—Robert J. Spar
Assistant Examiner—Leslie J. Paperner
Attorney, Agent, or Firm—Daniel Patch; Henry C. Westin

[57] ABSTRACT

A sheet inspection device for use in the manufacture of flat-rolled steel sheets where it is desired to inspect both sides of the sheet and thereafter to transfer the inspected sheet into selected piles. The device includes a number of rows of cooperative pairs of finger elements each mounted on a carriage that is interconnected in chain-like fashion and intermittently driven over a pair of rails arranged to form a continuous vertically arranged loop, the loop being related to a sheet feeding station from where the device when stationary receives the sheets one at a time, an inspection station where the carriages separate from each other to allow inspection of both sides of the sheets, and a discharge station where the inspected sheets are transferred to a selected one of several transfer cars constructed and motivated to handle both large and small groups of sheets.

2 Claims, 5 Drawing Figures

SHEET PILING APPARATUS

Present day flat-rolled sheet inspection is usually carried out by feeding the sheets after shearing to a tier type classifier. The classifier is provided with a number of different paths of travel formed by a series of continuous belt conveyors and sheet deflectors in which the sheets are decelerated and separated so that they may be inspected and fed to selected piles depending on certain criteria.

While such inspection arrangements have found wide use for many years in high production operations, they do not lend themselves to operations involving relatively small production and particularly where small order are the usual product mix. When the high production classifiers are employed to handle small orders, say for example, orders calling for groups of ten or fifteen sheets, the time required to change and adjust the equipment such as the guides and end stops renders the operation highly uneconomical.

Accordingly, the present invention provides a new and useful sheet piling, and if desired, for also inspecting and/or classifying, device that will afford maximum efficiency and economics in handling a product mix calling for a large number of small group orders as well as large group orders.

More particularly, it is the object of the present invention to provide a sheet or like material piling, inspection and/or classifying device including a number of sheet carrying elements each arranged to receive a sheet to be inspected, means for causing said elements to travel in a closed loop path of travel, means for causing said elements to expose both sides of the carried sheets to inspection while travelling around said path of travel, and means for receiving the inspected sheets to form selected piles thereof.

A further object of the present invention is to provide such a sheet or like material handling device including a number of rows of cooperative pairs of finger elements, each row mounted on a carriage that is interconnected in chain-like fashion and intermittently driven over a pair of rails arranged to form a continuous vertically arranged loop, the loop being related to a sheet feeding station from where the device when stationary receives the sheets one at a time, an inspection station where the carriages separate from each other to allow inspection of both sides of the sheets, and a discharge station where the inspected sheets are transferred to a selected one of several transfer cars constructed and motivated to handle both large and small groups of sheets.

Another object of the present invention is to provide such a sheet or like material handling device wherein there is associated with each row of fingers means for decelerating and stopping at a predetermined position sheets advanced to the device for inspection, classifying, and/or piling including a sheet deflecting means arranged after said discharge station in a manner to divert selected sheets into one of several piles.

These objects, as well as other novel features and advantages of the present invention, will be better understood when the following description of one embodiment thereof is read along with the accompanying drawings of which:

FIG. 2b is the remaining right hand portion of FIG. 2a;

FIG. 4 is an enlarged view of the base portion of one of the carriages shown in FIG. 2a.

Figure 1:
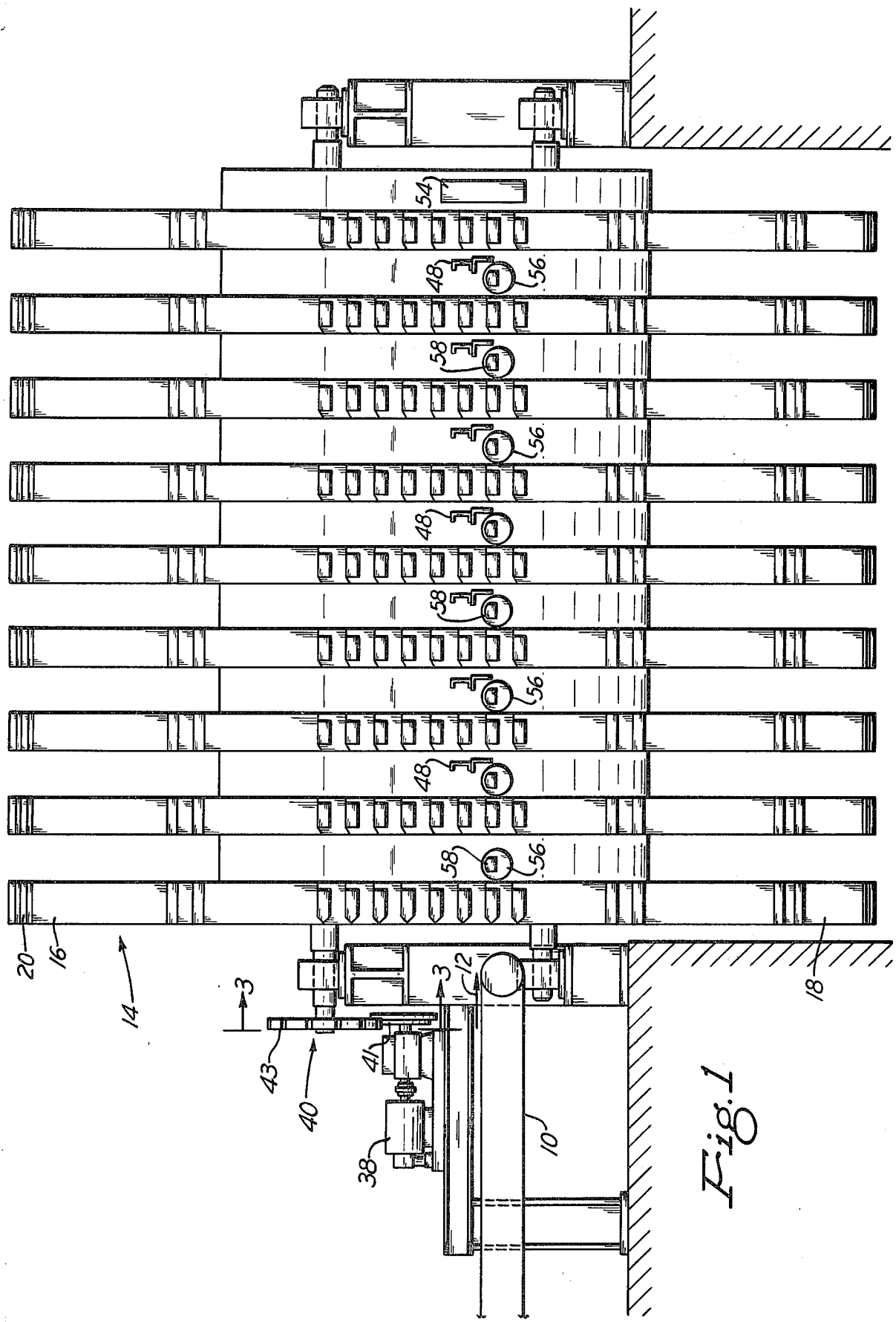
FIG. 1 is a front elevational view of a sheet inspection, classifying, or piling device constructed in accordance with the teachings of the present invention.

In referring to FIG. 1, to the left of the FIGURE, there is partially illustrated a conveyor 10 which receives flat-rolled steel sheets from a flying shear, not shown, the sheets being received in the direction of the arrow 12 in accordance with well-known practice. The sheared lengths of the sheets may vary depending on the requirement of the customer's orders and when advanced to the piling device 14 the sheets will be sufficiently spaced between themselves to allow intermittent movement and registry of the fingers of the piling device as will be explained more fully later on.

Figure 2A:
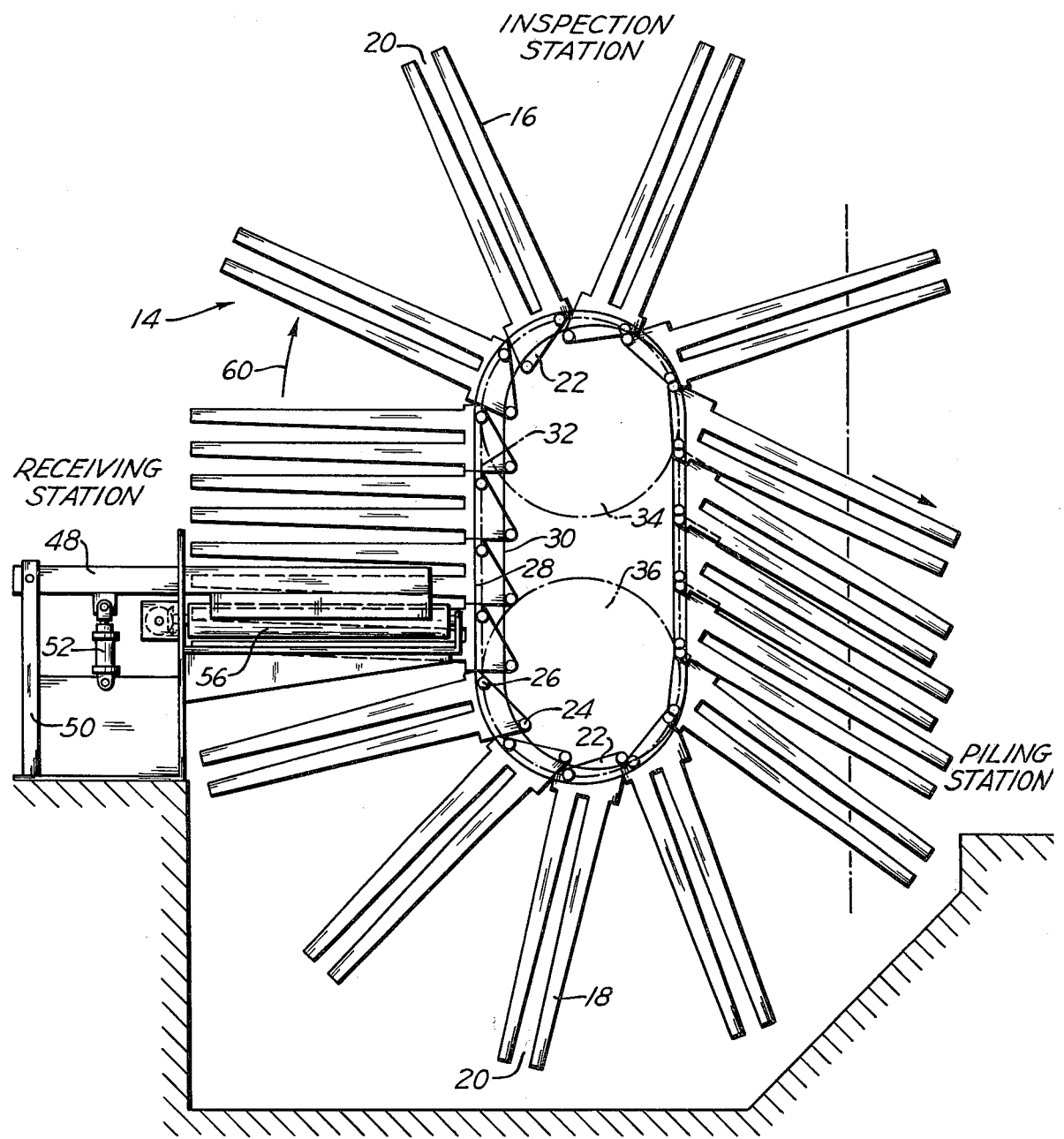
FIG. 2a is an end elevational view of the left hand side of the device shown in FIG. 1.

As to the piling device itself, FIG. 2a best illustrates its basic components. As shown, it comprises a number of rows of finger elements of which two are identified as 16 and 18, the rows formed of actually nine in-line assemblies if reference will be made to FIG. 1.

Figure 4:
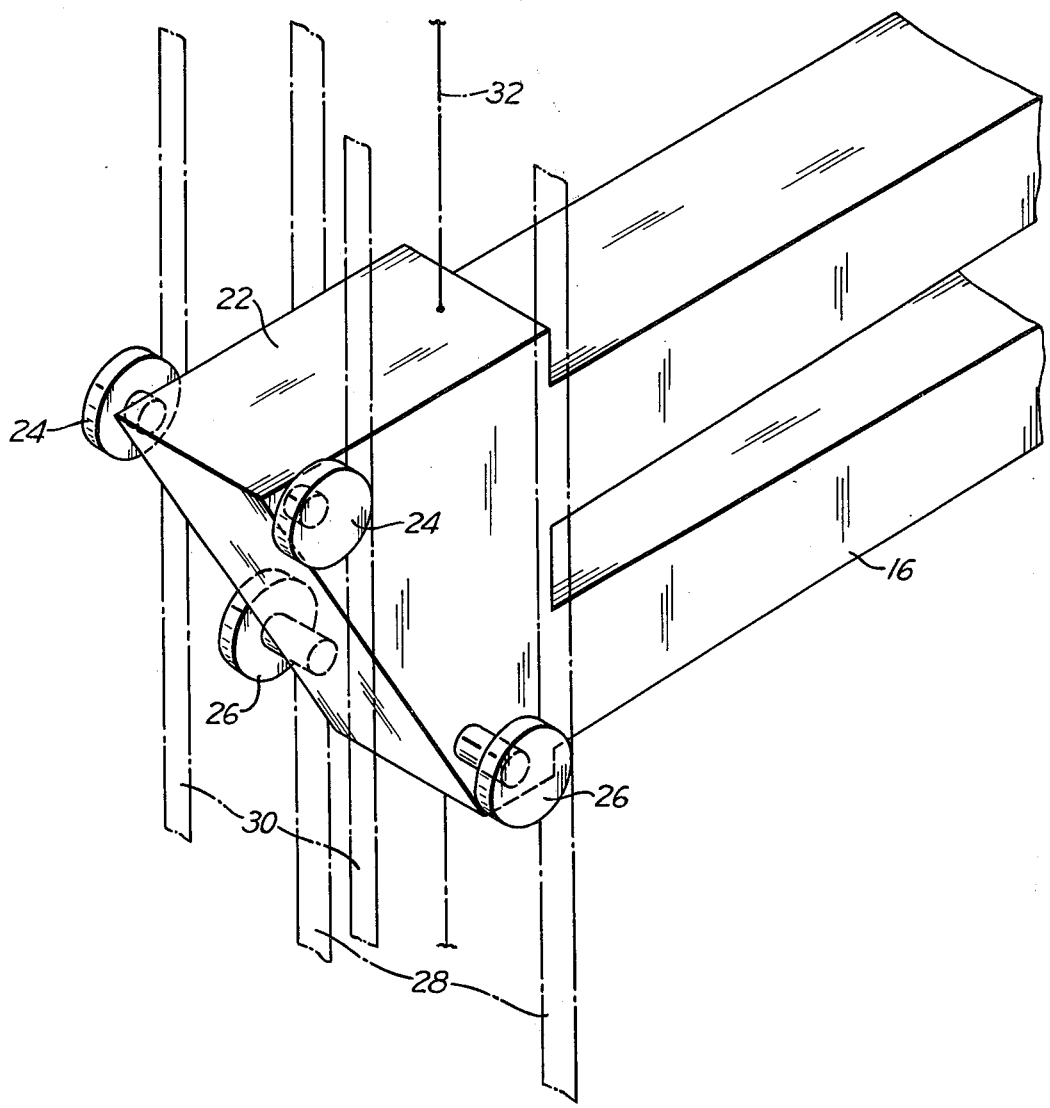

The finger elements of each assembly have openings 20 formed with outer open ends for receiving a sheet from the conveyor 10 when brought into registry therewith and at their bottoms or inner ends they take the form of carriages 22. The carriages include two sets of wheels 24 and 26, the set 24 being arranged inside the set 26 as best shown in FIG. 4. The swheels are received in two tracks 28 and 30, the wheels 24 in tracks 30 and the set of wheels 26 in the tracks 28, the tracks formed as two closed vertical loops so disposed, as shown best in FIG. 2a, that the angular disposition of the finger elements are controlled, particularly with reference to their receiving, inspection and discharge positions.

Figure 3:
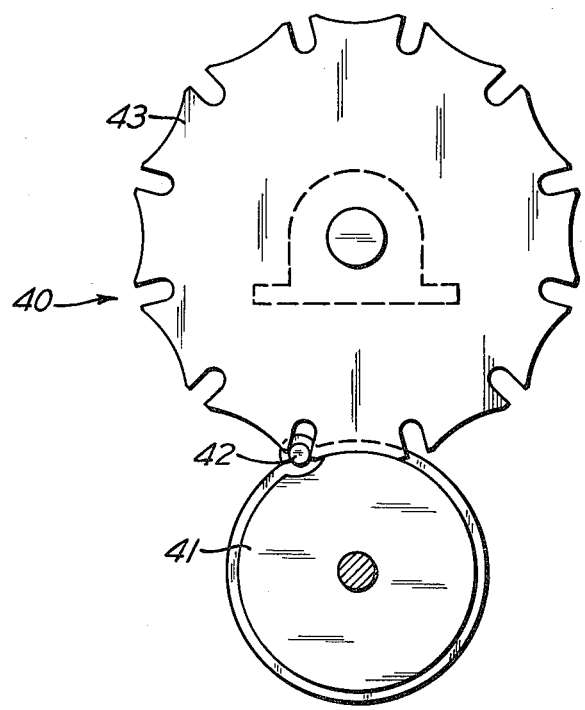
FIG. 3 is an enlarged sectional view taken on lines 3—3 of FIG. 1.

A chain 32 and two sprockets 34 and 36, the former being driven by a motor 38, shown only in FIG. 1, and a segmental wheel driving device 40 impart an intermittent movement to the chain 32 and hence, to the carriages 22. The segmental wheel driving unit 40 is of a well-known construction as can be seen in referring to FIG. 3, having a driving disk 41, a driving pin 42, and a drum wheel 43, in which, in addition to the intermittent movement imparted to the chain 32, the unit has the effect of locking the wheel 43 during the dead movement period of the driven wheel, which is advantageous when registering the openings 20 of the finger elements 16 in their receiving positions.

Figure 2B:
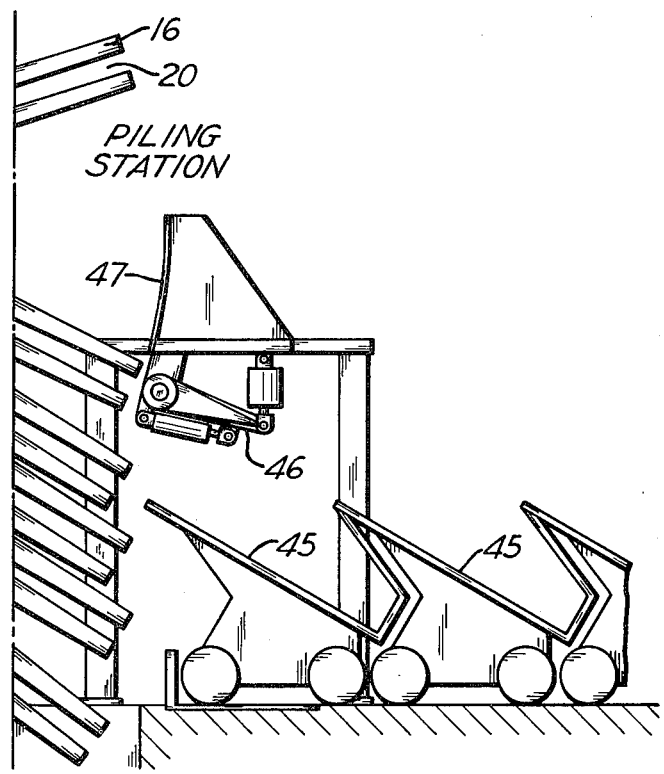

In regard to the control positioning of the carriages, and accordingly, the finger elements with reference to the various stations, the stations have been identified in FIGS. 2a and 2b by legends "Receiving Station", "Inspection Station", and "Piling Station". In FIG. 2a, a finger element is shown in the proper registered position in the Receiving Station. As to the Inspection Station, the tracks 28 and 30 are arranged to cause the carriages 22 to separate so that both sides of the sheet can be quickly and effectively scanned in the four upper positions assumed by each carriage when passing through the inspection station. This scanning can be performed by a workman or by instrumentation.

In the Piling Station, the positions or dispositions of the finger elements are controlled to cooperate with a series of wheel-rail supported piling cars 45, best shown in FIG. 2b where they are arranged to receive sheets directed by an adjustable and expandable selector gate 46. Before reaching the gate, the sheets pass from the fingers 16 into an abutting relationship with a curve stop 47. The piling cars 45 may be arranged to form a continuous supply of receiving areas which can be quickly brought into and out of the receiving positions so that very small orders as well as large orders can be filled without requiring any stoppage of the inspection or piling device or changing of equipment such as guides and stops.

In order to decelerate and stop the sheets when passing into the finger element there is provided between all but the first elements retractable stops 48, one being shown in FIG. 2a in its operative position where it is brought by being pivotally mounted to an upright 50 and rotated by a piston cylinder assembly 52. At the innermost or last finger there is arranged a stationary stop 54. The sheets are led into the finger elements by a series of power driven magnet rollers 56; the electro magnet being shown at 58, and the rollers being employed to support and decelerate the sheets. Instead of a magnetic force, a vacuum force may be employed.

In operation, the particular movable stop 48, if the stop 54 is not being used, is elected to stop the sheet at the desired point to assure that an even pile will be formed and that the pile will be positioned as desired on the car 45. The first sheet is received with the opening 20 of one of the finger elements 16 in proper registry with the conveyor 10 which sheet will be decelerated by the magnetic rollers 56 before coming to a complete stop against the stops 48 or 54. After this the motor 38 is operated and through the segmented wheel driving device 40 the finger elements are advanced in a clock-wise direction identified by the arrow 60 in FIG. 2a. The intermittent lull in the driving system will allow additional sheets to be progressively loaded into the device and when the sheets reach the inspection station time is given to allow effective inspection.

When the loaded finger elements reach the piling station, the deflector gate 46 will be positioned to discharge one or more sheets into one of the cars 45. As soon as a car or cars have been filled or received the designated number of sheets for an order, the car or cars are quickly shifted to the right as one views FIG. 2b and an empty car or cars are positioned to receive the next several sheets. It will be appreciated that while the illustrated device is employed to inspect sheets, the device can be employed to simply pile sheets without inspection.

In accordance with the provisions of the patent statutes, I have explained the principle and operation of my invention and have illustrated and described what I consider to represent the best embodiment thereof.

I claim:

1. A sheet or like material handling device for use in inspecting, classifying, and/or piling comprising:

means for conveying shheets in succession to said device, a number of rows of cooperative pairs of finger elements, each row mounted on carriages and arranged in a common plane, said finger elements having their closed sides in a common plane with respect to their assoicated row, said rows being arranged when in a sheet receiving position to receive a sheet so that the sheet moves progressively into a first finger element and then into succeeding elements of said receiving row and in a direction parallel to the closed sides of said receiving finger elements, means for interconnecting said carriages in chainlike fashion, means for supporting said carriages and arranged to form a continuous vertically arranged loop and wherein adjacent carriages in said common plane are interconnected, said loop being related to the sequential positioning of said carriages in a sheet feeding station from where the device, when stationary, receives sheets one at a time, in an inspection station where the sheets are inspected, and in a discharge station where the inspected sheets are transferred to transfer car means constructed and motivated to handle both large and small piles of sheets, said supporting means including a rail system constructed and arranged to generally follow the contour of said loop, said rail system having portions for contacting and displacing each of said carriages during their travel around said loop to cause a predetermined separation of said carriages from each other to expose for inspection both sides of a sheet carried by a row of said finger elements in said inspection station, and means for intermittently advancing said carriages around said loop.

2. In a sheet or like material handling device according to claim 1, wherein said transfer car means includes a series of similar cars constructed and arranged to be moved into and out of a predetermined piling position, there being a sufficient number of said cars to replace cars that have completed their piles so that a continuous formation of small piles can be produced.

* * * * *